US009882693B2

(12) United States Patent  
Sanderovich et al.

(10) Patent No.: US 9,882,693 B2  
(45) Date of Patent: Jan. 30, 2018

(54) SHORT TRAINING TIME FOR MIMO SYSTEMS

(71) Applicant: QUALCOMM Incorporated, San Diego, CA (US)

(72) Inventors: Amichai Sanderovich, Atlit (IL); Alecsander Eitan, Haifa (IL)

(73) Assignee: QUALCOMM, Incorporated, San Diego, CA (US)

( * ) Notice: Subject to any disclaimer, the term of this patent is extended or adjusted under 35 U.S.C. 154(b) by 0 days.

(21) Appl. No.: 15/257,350

(22) Filed: Sep. 6, 2016

(65) Prior Publication Data

US 2017/0078053 A1    Mar. 16, 2017

Related U.S. Application Data

(60) Provisional application No. 62/216,979, filed on Sep. 10, 2015.

(51) Int. Cl.
| | |
|---|---|
| H04L 1/02 | (2006.01) |
| H04L 5/00 | (2006.01) |
| H04B 7/0413 | (2017.01) |
| H04B 7/06 | (2006.01) |
| H04W 72/04 | (2009.01) |

(52) U.S. Cl.
CPC ............ H04L 5/005 (2013.01); H04B 7/0413 (2013.01); H04B 7/0617 (2013.01); H04B 7/0639 (2013.01); H04B 7/0695 (2013.01); H04W 72/0453 (2013.01)

(58) Field of Classification Search
CPC ..... H04L 5/005; H04B 7/0413; H04B 7/7017; H04B 7/0456

USPC ....... 375/267, 260, 299, 316, 346, 347, 349; 370/252, 312, 329
See application file for complete search history.

(56) References Cited

U.S. PATENT DOCUMENTS

| | | | |
|---|---|---|---|
| 2006/0274847 | A1 | 12/2006 | Molisch et al. |
| 2013/0115886 | A1 | 5/2013 | Khan et al. |
| 2013/0301454 | A1 | 11/2013 | Seol et al. |
| 2014/0323144 | A1 | 10/2014 | Kim et al. |
| 2016/0234353 | A1 | 8/2016 | Kwon et al. |
| 2016/0269093 | A1* | 9/2016 | Seol ...................... H04B 7/043 |

FOREIGN PATENT DOCUMENTS

WO    WO-2014116090 A1    7/2014

OTHER PUBLICATIONS

International Search Report and Written Opinion—PCT/US2016/050569—ISA/EPO—dated Dec. 9, 2016.

* cited by examiner

*Primary Examiner* — Khai Tran  
(74) *Attorney, Agent, or Firm* — Loza & Loza LLP

(57) ABSTRACT

Methods for wireless communication and system therefrom are provided. According to aspects, a method includes generating a plurality of training packets for transmission, and outputting each of the plurality of training packets for transmission to a device in a different one of a plurality of directions, wherein at least two of the plurality of training packets are output for transmission to the device in at least two of the plurality of directions using orthogonal transmission types. The method also includes obtaining a feedback signal comprising information for identifying at least one of the plurality of directions to be used for wireless communications with the device.

26 Claims, 12 Drawing Sheets

SHORT TRAINING TIME FOR MIMO SYSTEMS

RELATED APPLICATION

This application claims priority under 35 U.S.C. §119(e) to U.S. Provisional Application No. 62/216,979 filed on Sep. 10, 2015, the entire specification of which is incorporated herein by reference.

FIELD

Aspects of the present disclosure relate generally to wireless communications devices, and more particularly, to training of wireless communications devices.

BACKGROUND

Communications devices commonly implement multiple-input and multiple-output (MIMO) approaches to overcome signal degradation due to high free space path losses (FSPL) for particular radio bands. For example, communications using mm-wave signals in the 50 GHz band are susceptible to high FSPL. Accordingly, to alleviate this issue, such communications are typically implemented using a plurality of antennas and beamforming. That is, a first device will transmit the same signal using each of the antennas, but adjusts at least the phase of each antenna to form a coherent beam in a direction of a second device engaged in a communications session with the first device.

As can be seen from the above, beamforming requires the identification of a direction associated with another device. Typically, this direction is obtained by performing a sector sweep. That is, the first device sends packets out in a plurality of directions and then the second device responds by identifying the direction associated with the best received packet.

SUMMARY

The following presents a simplified summary of one or more aspects of the present disclosure in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One aspect of the present disclosure involves a method for wireless communications. The method includes generating a plurality of training packets, and outputting each of the plurality of training packets for transmission to a device in a different one of a plurality of directions, wherein at least two of the plurality of training packets are output for transmission to the device in at least two of the plurality of directions using orthogonal transmission types. The method also includes obtaining a feedback signal comprising information for identifying at least one of the plurality of directions to be used for wireless communications with the device.

An aspect of the present disclosure involves another method for wireless communications. The method includes receiving a plurality of training packets transmitted in a plurality of different directions from a device, wherein at least two of the plurality of training packets for at least two of the plurality of different directions are received via different frequencies in a radio band or using different spreading sequences. The method also includes identifying information corresponding to at least one direction from the plurality of directions for wireless communications with the device based on the plurality of training packets, and outputting a feedback signal for transmission to the device, the feedback signal comprising the identified information corresponding to the at least one direction.

An aspect of the present disclosure involves an apparatus for wireless communications. The apparatus includes a processing system configured to generate a plurality of training packets, and a first interface configured to output each of the plurality of training packets for transmission to a device in a different one of a plurality of directions, wherein at least two of the plurality of training packets are output for transmission to the device in at least two of the plurality of directions using orthogonal transmission types. The apparatus also includes a second interface configured to obtain a feedback signal comprising information for identifying at least one of the plurality of directions to be used for wireless communications with the device.

An aspect of the present disclosure involves an apparatus for wireless communications. The apparatus includes a first interface configured to receive a plurality of training packets transmitted in a plurality of different directions from a device, wherein at least two of the plurality of training packets for at least two of the plurality of different directions are received via different frequencies in a radio band or using different spreading sequences. The apparatus also includes a processing system configured to identify information corresponding to at least one direction from the plurality of directions for wireless communications with the device based on the plurality of training packets, and a second interface for outputting a feedback signal for transmission to the device, the feedback signal comprising the identified information corresponding to the at least one direction.

An aspect of the present disclosure involves an apparatus for wireless communications. The apparatus includes means for generating a plurality of training packets, and means for outputting each of the plurality of training packets for transmission to a device in a different one of a plurality of directions, wherein at least two of the plurality of training packets are output for transmission to the device in at least two of the plurality of directions using orthogonal transmission types. The apparatus also includes means for obtaining a feedback signal comprising information for identifying at least one of the plurality of directions to be used for wireless communications with the device.

An aspect of the present disclosure involves an apparatus for wireless communications. The apparatus includes means for receiving a plurality of training packets transmitted in a plurality of different directions from a device, wherein at least two of the plurality of training packets for at least two of the plurality of different directions are received via different frequencies in a radio band or using different spreading sequences. The apparatus also includes means for identifying information corresponding to at least one direction from the plurality of directions for wireless communications with the device based on the plurality of training packets, and means for outputting a feedback signal for transmission to the device, the feedback signal comprising the identified information corresponding to the at least one direction.

An aspect of the present disclosure involves a wireless station. The wireless station includes a receiver configured to receive a plurality of training packets transmitted in a plurality of different directions from a device, wherein at least two of the plurality of training packets for at least two of the plurality of different directions are received via different frequencies in a radio band or using different spreading sequences. The wireless station also includes a processing system configured to identify information corresponding to at least one direction from the plurality of directions for wireless communications with the device based on the plurality of training packets, and a transmitter configured to transmit a feedback signal to the device, the feedback signal comprising the identified information corresponding to the at least one direction.

An aspect of the present disclosure involves an access point. The access point includes a processing system configured to generate a plurality of training packets, and a transmitter configured to transmit each of the plurality of training packets to a device in a different one of a plurality of directions, wherein at least two of the plurality of training packets are transmitted to the device in at least two of the plurality of directions using orthogonal transmission types. The access point also includes a receiver configured to receive a feedback signal comprising information for identifying at least one of the plurality of directions to be used for wireless communications with the device.

An aspect of the present disclosure involves a computer readable medium. The computer readable medium has instructions stored thereon for generating a plurality of training packets, and outputting each of the plurality of training packets for transmission to a device in a different one of a plurality of directions, wherein at least two of the plurality of training packets are output for transmission to the device in at least two of the plurality of directions using orthogonal transmission types. The computer readable medium also has instructions stored thereon for obtaining a feedback signal comprising information for identifying at least one of the plurality of directions to be used for wireless communications with the device.

An aspect of the present disclosure involves a computer readable medium. The computer readable medium has instructions stored thereon for receiving a training packets transmitted in a plurality of different directions from a device, wherein at least two of the plurality of training packets for at least two of the plurality of different directions are received via different frequencies in a radio band or using different spreading sequences. The computer readable medium also has instructions stored thereon for identifying information corresponding to at least one direction from the plurality of directions for wireless communications with the device based on the plurality of training packets, and outputting a feedback signal for transmission to the device, the feedback signal comprising the identified information corresponding to the at least one direction.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents.

DETAILED DESCRIPTION

Figure 1:
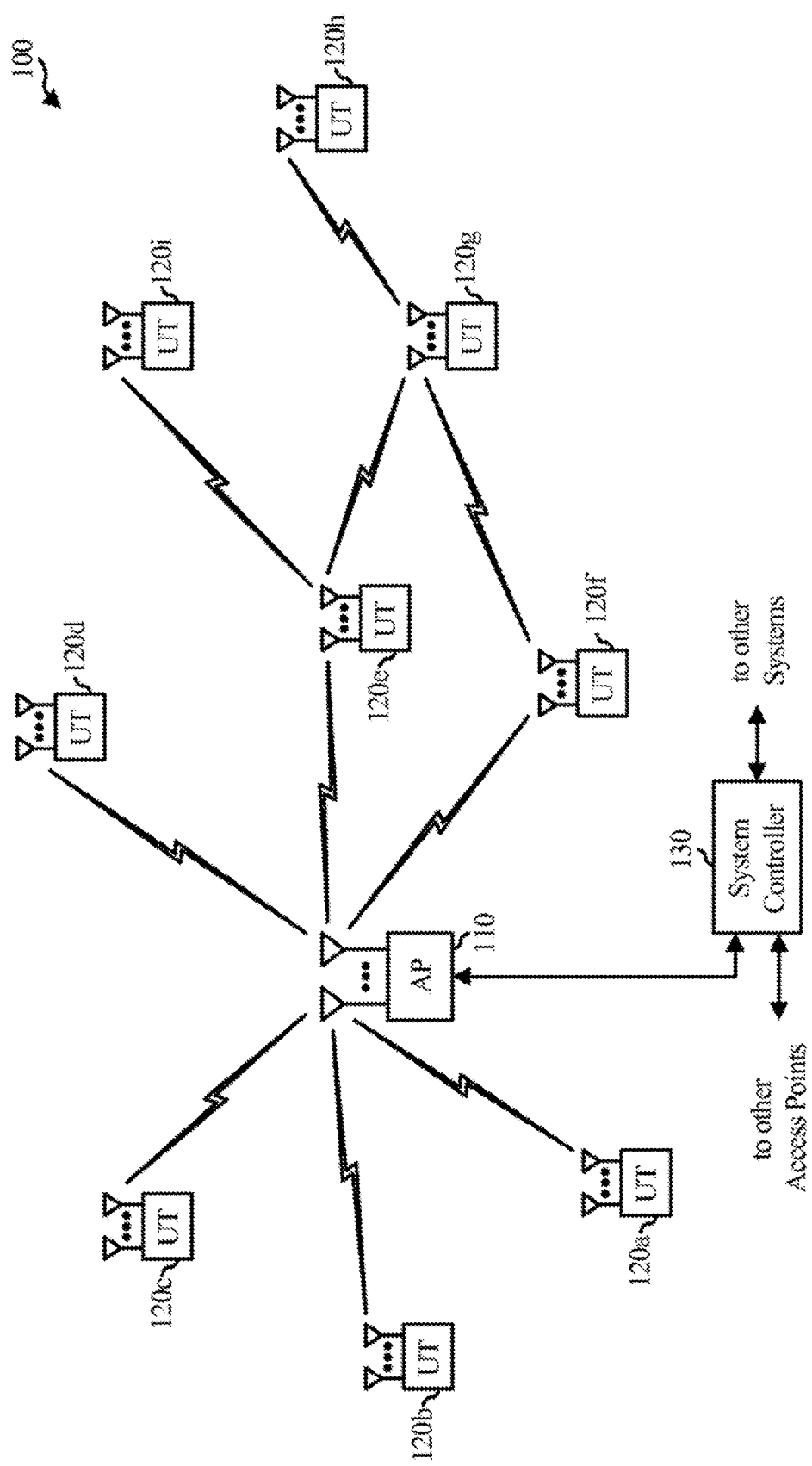
FIG. 1 illustrates a diagram of an example wireless communications network, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The present disclosure is related to a training sweep process for Access Point (AP) devices and other similar devices, as shown below, to determine a direction for communications with other devices. As used herein, the term "communications" refers to transmission and/or reception. For convenience, this improved process will be described in the context of an AP device implementation. However, it is understood that techniques described herein may have other applications, as will be explained further below.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting and the scope of the disclosure is being defined by the appended claims and equivalents thereof.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal. A wireless node may provide, for example, connectivity for or to a network (e.g., a wide area network such as the Internet or a cellular network) via a wired or wireless communication link.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium.

An Example Wireless Communication System

The techniques described herein may be used for various broadband wireless communication systems, including communication systems that are based on an orthogonal multiplexing scheme. Examples of such communication systems include Spatial Division Multiple Access (SDMA) system, Time Division Multiple Access (TDMA) system, Orthogonal Frequency Division Multiple Access (OFDMA) system and Single-Carrier Frequency Division Multiple Access (SC-FDMA) systems. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal. A wireless node may provide, for example, connectivity for or to a network (e.g., a wide area network such as the Internet or a cellular network) via a wired or wireless communication link.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium.

FIG. 1 illustrates an example wireless communication system in which aspects of the present disclosure may be practiced. For example, AP 110 may be configured to generate and transmit a frame having one or more bits that indicate both minimum and maximum bandwidths for communicating in a network. UT 120 may be configured to obtain (e.g., receive) the frame and determine, based on the one or more bits in the frame, both the minimum and maximum bandwidths for communicating in the network.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, a user equipment, or some other terminology. Access point 110 may communicate with one or more user terminals 120 at any given moment on the downlink and uplink. The downlink (i.e., forward link) is the communication link from the access point 110 to the user terminals 120, and the uplink (i.e., reverse link) is the communication link from the user terminals 120 to the access point 110. A user terminal may also communicate peer-to-peer with another user terminal.

A system controller 130 may provide coordination and control for these APs and/or other systems. The APs may be managed by the system controller 130, for example, which may handle adjustments to radio frequency power, channels, authentication, and security. The system controller 130 may communicate with the APs via a backhaul. The APs may also communicate with one another, e.g., directly or indirectly via a wireless or wireline backhaul.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The SDMA system may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to a different user terminal 120.

Figure 2:
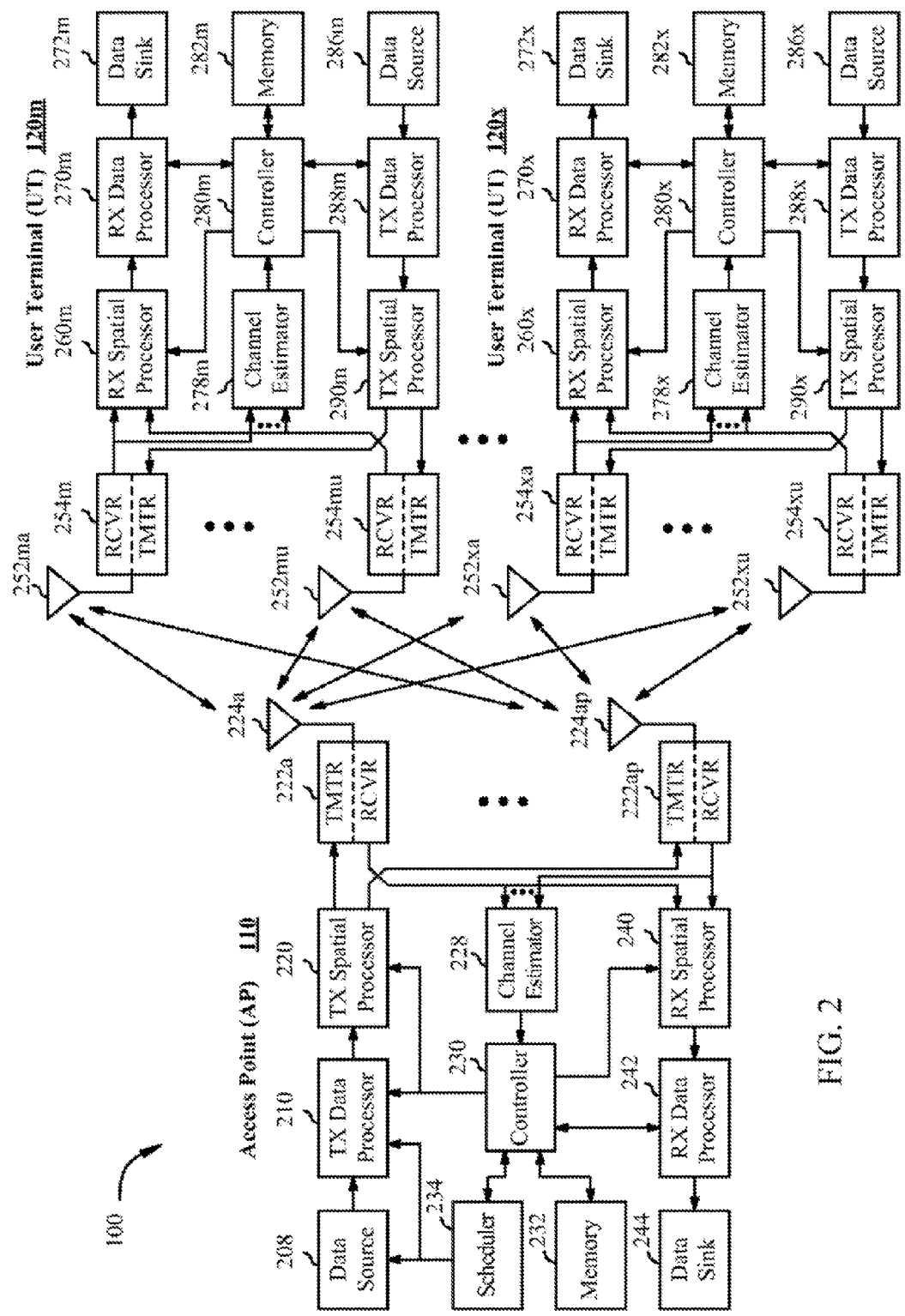
FIG. 2 illustrates a block diagram of an example access point and user terminals, in accordance with certain aspects of the present disclosure.

FIG. 2 illustrates example components of the AP 110 and UT 120 illustrated in FIG. 1, which may be used to implement aspects of the present disclosure. One or more components of the AP 110 and UT 120 may be used to practice aspects of the present disclosure. For example, antenna 224, Tx/Rx 222, processors 210, 220, 240, 242, and/or controller 230 may be used to perform the operations described herein and illustrated with reference to FIGS. 5, 6 and 9. Similarly, antenna 252, Tx/Rx 254, processors 260, 270, 288, and 290, and/or controller 280 may be used to perform the operations described herein and illustrated with reference to FIGS. 5, 6 and 11.

FIG. 2 illustrates a block diagram of access point 110 and two user terminals 120m and 120x in MIMO system 100.

The access point 110 is equipped with $N_t$ antennas 224a through 224ap. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. The controller 280 may be coupled with a memory 282. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing. The controller 230 may be coupled with a memory 232.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a pre-coding or beamforming, as described in the present disclosure) on the $N_n$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal. The decoded data for each user terminal may be provided to a data sink 272 for storage and/or a controller 280 for further processing.

At each user terminal 120, a channel estimator 278 estimates the downlink channel response and provides downlink channel estimates, which may include channel gain estimates, SNR estimates, noise variance and so on. Similarly, at access point 110, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
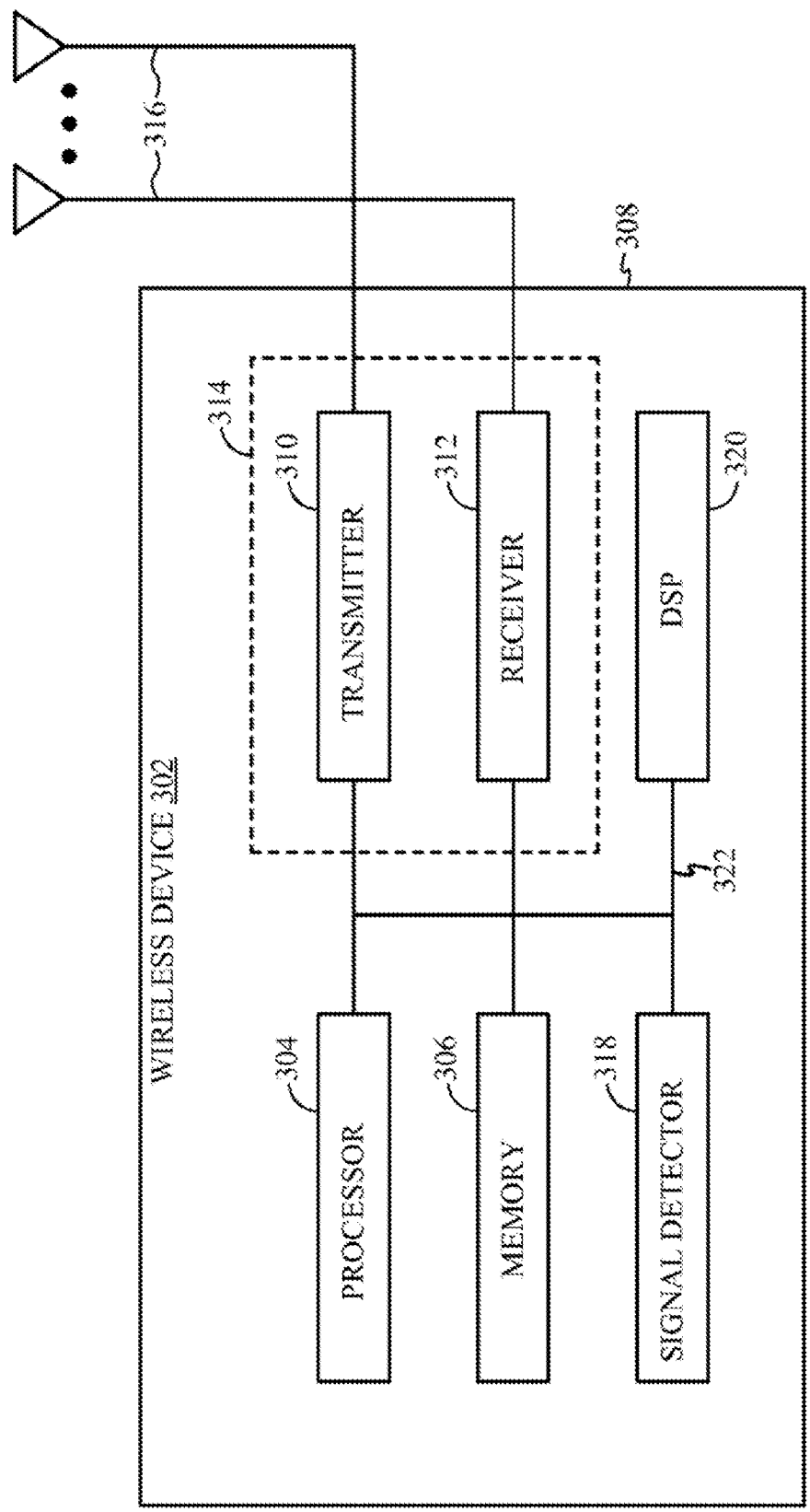
FIG. 3 illustrates a block diagram of an example wireless device, in accordance with certain aspects of the present disclosure.

FIG. 3 illustrates example components that may be utilized in the AP 110 and/or UT 120 to implement aspects of the present disclosure. For example, the transmitter 310, antenna(s) 316, processor 304 and/or the DSP 320 may be used to practice aspects of the present disclosure implemented by the AP. Further, the receiver 312, antenna(s) 316, processor 304 and/or the DSP 320 may be used to practice aspects of the present disclosure implemented by the UT.

FIG. 3 illustrates various components that may be utilized in a wireless device 302 that may be employed within the MIMO system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote node. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Improved Training Sweep Process

Figure 4:
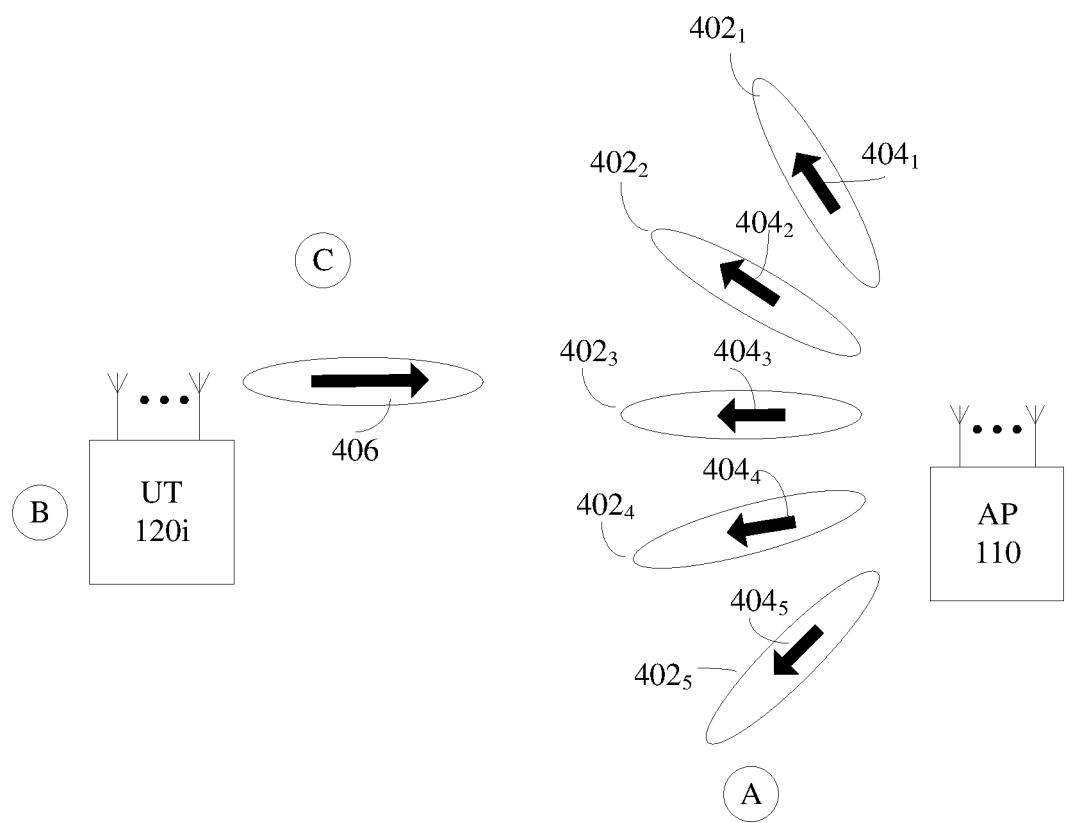
FIG. 4 is a schematic illustration of sector sweeps that is useful for describing aspects of the present disclosure.

To provide a better foundation for understanding the various aspects of the present disclosure, reference is first made to FIG. 4 which schematically illustrates a conventional training process.

As noted above, in order for an access point, such as AP 110, to establish a communications link with a user terminal, such as UT 120i, a training process is performed. As shown in FIG. 4, this training process typically involves, for example (A) AP 110 performing a sector sweep by transmitting signals $402_1$, $402_2$, $402_3$, $402_4$, and $402_5$ in a plurality of directions $404_1$, $404_2$, $404_3$, $404_4$, and $404_5$, (collectively 404), respectively, where each signal represents training packets for the UT 120i. Such signal can be directed using beamforming processes with the antenna array in the MIMO AP. Then, (B) a UT 120i receives the signals and determines which of the directions 404 is associated with a best received packet. Finally, the UT 120i transmits a feedback signal 406 back to the AP 110. Thereafter, the AP 110 can be configured to provide the communications session with UT 120i using the selected direction.

A significant issue with conventional sector sweep processes is the amount of time required for performing the sector sweep. In particular, a sector sweep is typically performed using a single RF chain, i.e., a transceiver with a single transmitter and a single receiver. Thus, to provide signals in each direction, the signals for each direction are generated serially. Accordingly, for a large number of directions, the amount of time required for the sweep may be non-trivial and thus the time for establishing a communication link is increased. Moreover, whenever a communications link is disrupted, this also requires performing the sector sweep anew.

The present disclosure contemplates that a new training sweep process can be utilized with wireless communications devices, such as AP 110 and others, to overcome the limitations of conventional sweep processes.

As noted above, a significant limitation of conventional sector sweep processes is that signals representing the training packets must be transmitted serially. However, the present disclosure contemplates that a sector sweep can be performed in parallel. In particular, the present disclosure contemplates that when AP 110 is configured as a MIMO configuration with two or more RF chains, the multiple RF chains can be utilized to transmit non-interfering or non-interacting signals contemporaneously, i.e., during the same time interval or during overlapping time intervals. In particular, each of the RF chains can be configured to operate with a different, non-interfering transmission types in a radio band of interest using a different subset of the antennas of the MIMO configuration configured for a different direction.

For example, each of the RF chains can be configured to operate with a different frequency within a radio band of interest and/or a different spreading sequence. As a result, the signals will not interfere with each other and the packets for the different directions can be evaluated separately. This is schematically illustrated with respect to FIGS. 5 and 6.

Figure 5:
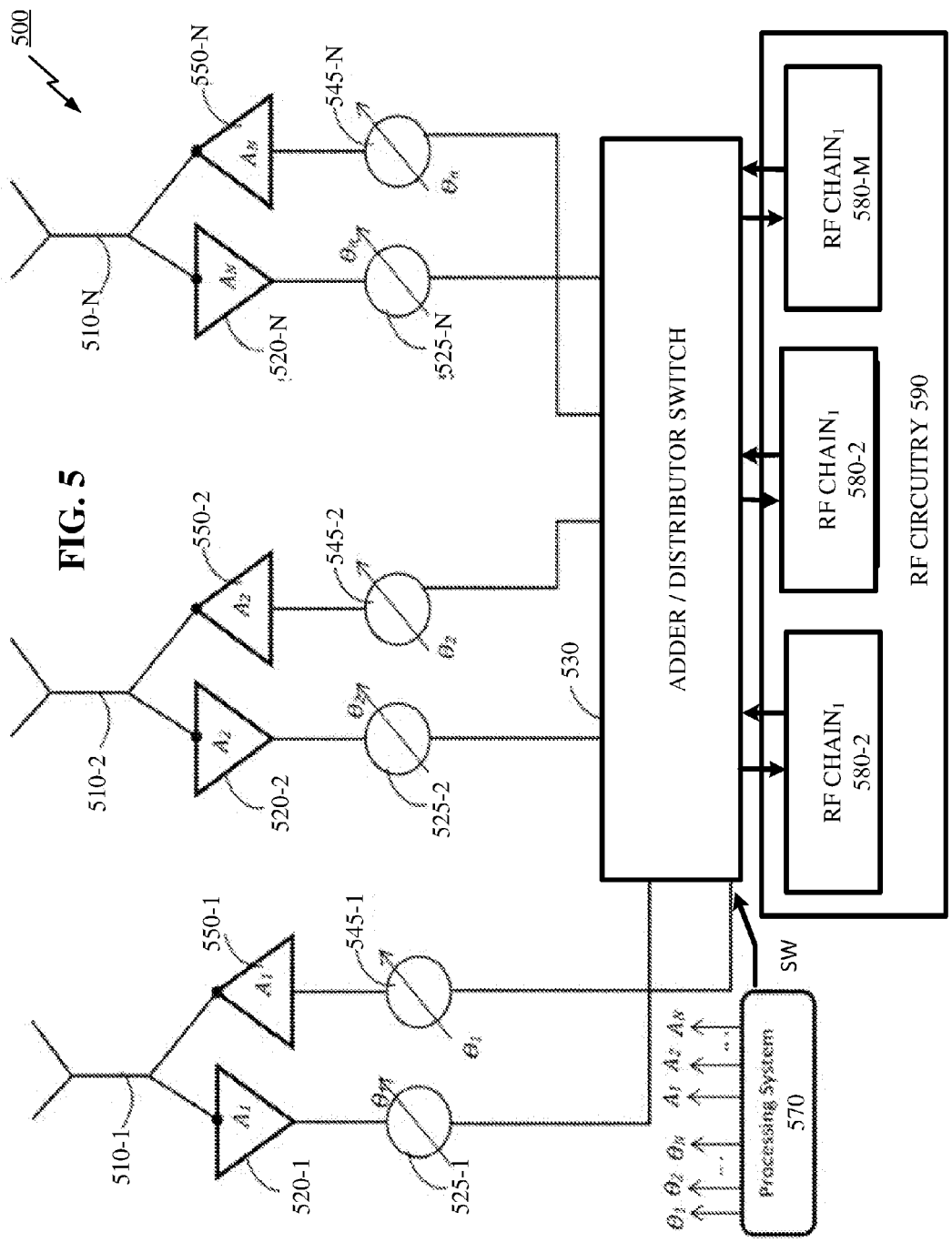
FIG. 5 is a schematic diagram of an exemplary configuration for operating an array in a radio module according to an aspect of the present disclosure.

Turing first to FIG. 5, there is shown an exemplary configuration of an antenna array 500, including its supporting components, according to an aspect of the present disclosure. Although FIG. 5 and FIGS. 1-3 substantially overlap, FIG. 5 is presented for ease of illustration. Accordingly, FIGS. 1, 2, 3, and 5 should be interpreted as presenting various features of the same or different wireless communications devices.

As shown in FIG. 5, the antenna array 500 includes a number N of antennas or radiating elements 510-1 through 510-N, each of which is designed to receive and transmit signals. For example, mm-wave signals over the 60 GHz frequency band. As noted above with respect to FIGS. 1-3, the radiating elements 510-1 through 510-N may be constructed using different type of antenna elements.

In the receive direction, each of the radiating elements 510-1 through 510-N is respectively connected to a low noise amplifier (LNA) 520-1 through 520-N (hereinafter referred to collectively as LNAs 520 or individually as LNA 520, merely for the sake of simplicity and without restriction on the disclosed aspects) and a phase shifter 525-1 through 525-N (hereinafter referred to collectively as phase shifters 525 or individually as a phase shifter 525, merely for the sake of simplicity and without restriction on the disclosed aspects).

In the transmit direction, each of the radiating elements 510-1 through 510-N is respectively connected to a power amplifier (PA) 540-1 through 540-N (hereinafter referred to collectively as power amplifiers 540 or individually as a power amplifier 540, merely for the sake of simplicity and without restriction on the disclosed aspects) and to a phase shifter 545-1 through 545-N (hereinafter referred to collectively as phase shifters 545 or individually as a phase shifter 545).

According to the disclosed aspects, the phase $\theta_i$ of each phase shifter 525 or 545 are individually or independently controlled during the reception or transmission of signals. In addition, the gain $A_i$ of each of the LNAs 520 or PAs 540 is independently controlled during the reception or transmission of signals. Thus, according to the disclosed aspects, the gains and phases ($A_i$; $\theta_i$, i=1 . . . N) of the signal feeds to the elements are individual controlled.

The radiating elements 510-1 through 510-N can be selectively coupled to RF chains 580-1 through 580-M in RF circuitry 590 via adder/distribution (AD) switch (AD) 530. In some aspects M<N, but the present disclosure also contemplates that M≥N. The AD switch 530 can be configured to provide several functions.

First, the AD switch 530 can be used to couple each of RF chains 580-1 through 580-M to one or more of radiating elements 510-1 through 510-N based on some input control signals. In particular, the AD switch 530 can be utilized to couple a different and distinct subset of radiating elements 510-1 through 510-N to each one of RF chains 580-1 through 580-M. In this manner, each of RF chains 580-1 through 580-M and its corresponding antenna subset effectively form a separate transceiver/antenna structure.

Second, the AD switch 530 can be used to provide an adder function. That is, for the receive direction, AD switch 530 can be used to combine signals from ones of radiating elements 510-1 through 510-N currently coupled to a one of RF chains 580-1 through 580-M. Third, the AD switch 530 can be used to provide a distributor function. That is, for the transmit direction, AD switch 530 can be used to distribute signals from a one of RF chains 580-1 through 580-M to currently coupled ones of radiating elements 510-1 through 510-M.

In an aspect, the controllable components, i.e., the amplifiers 520 and 540, the phase shifters 525 and 545, and the AD switch 530 are controlled by a processing system 570. Thus, the processing system 570 may be configured to operate the antenna array 500 by selecting which of radiating elements 510-1 through 510-N are coupled to each of RF chains 580-1 through 580-M and adjusting feed gains and phases of the radiating elements 510-1 through 510-N. In particular aspects, this involves adjusting feed gains and phases of the radiating elements 510-1 through 510-N in accordance with a direction(s) associated with a corresponding one of the radiating elements 510-1 through 510-N.

The processing system 570 may comprise or be a component of a larger processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information.

The processing system 570 may also include computer-readable or machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

In one aspect, the processing system 570 may be integrated into the RF circuitry 590. In another aspect, the processing system 570 may be part of a baseband module of the AP device or similar device (not shown). Similarly, the RF circuitry 590 may be integrated into a baseband module (not shown) or other component.

Although FIG. 5 shows a particular combination of elements, this is solely for ease of illustration. Rather, the present disclosure contemplates that number and arrangement of elements in FIG. 5 can vary. For example, in some configurations, rather than having amplifiers and phase shifters for each of radiating elements 510-1 through 510-N, amplifiers and/or phase shifters can be provided for each of RF chains 580-1 through 580-M for each of radiating elements 510-1 through 510-N. However, the present disclosure contemplates that the various aspects can be utilized with any other arrangements of elements.

Figure 6:
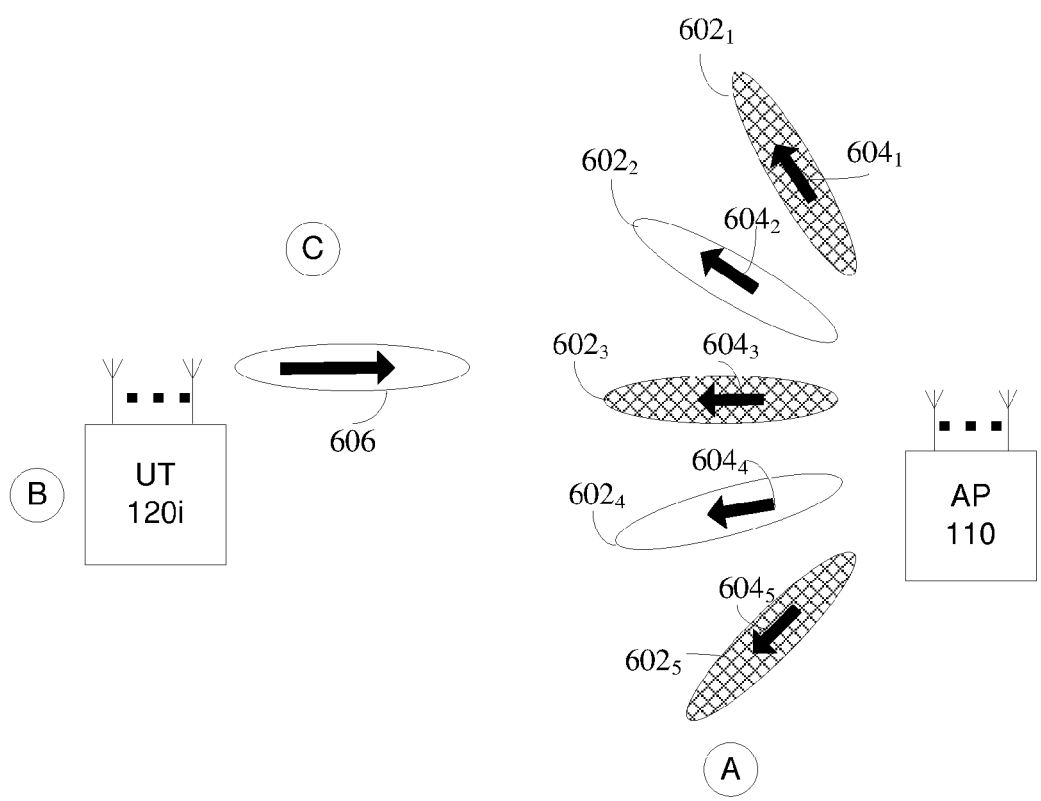
FIG. 6 is a schematic illustration of sector sweeps in accordance with aspects of the present disclosure.

Turning next to FIG. 6, the operation of the configuration of FIG. 5 in accordance with an aspect of the present disclosure is illustrated. Similar to the process illustrated in FIG. 4, a training sweep process also begins by performing (A) a sector sweep by transmitting signals in a plurality of directions $604_1$, $604_2$, $604_3$, $604_4$, and $604_5$, (collectively 604). However, unlike the process of FIG. 4, the signals are transmitted using orthogonal transmission types and at least some are transmitted contemporaneously, as shown in FIG. 6.

As used herein, the terms "orthogonal transmissions" or "orthogonal transmission types" refer to transmissions or types thereof which do not interfere with each other. Alternatively stated, these also refer to transmissions or types thereof that can be separately detected even when they are received at the same time. Additionally, the present disclosure contemplates that "orthogonal transmissions" also include so-called quasi-orthogonal transmissions that consist of transmissions that are not strictly orthogonal in terms of phase or other properties, but that are still sufficiently different to enable transmissions or types thereof that can be separately detected even when they are received at the same time.

For example, referring to FIG. 5, this can involve associating a first one of the directions 604 (e.g., direction $604_1$) to a first one of the RF chains 580-1 to 580-M transmitting using a first orthogonal transmission type and configuring the associated ones of radiating elements 510-1 to 510-N to provide beamforming in the first direction. This can also involve associating a second one of the directions 604 (e.g., direction $604_2$) to a second one of the RF chains 580-1 to 580-M using a second orthogonal transmission type and configuring the associated ones of radiating elements 510-1 to 510-N to provide beamforming in the second direction.

Referring back to FIG. 6, the signals $602_1$ and $602_2$ for the first and second directions $604_1$ and $604_2$, respectively, can then be transmitted using different orthogonal transmission types (indicated in FIG. 6 by different patterns) during a first time interval $t_1$ without interfering with each other. In a similar matter, the signals $602_3$ and $602_4$ for third and fourth directions $604_3$ and $604_4$, respectively, can then also be transmitted using different orthogonal transmission types (indicated in FIG. 6 by different patterns) during a second time interval $t_2$ without interfering with each other. Finally, the signal $602_5$ for a fifth direction $604_5$ can then also be transmitted during a third time interval $t_3$. As a result, the total time for transmitting signals is reduced significantly. For example, in the case of FIG. 6, where two RF chains are utilized, the total time is reduced by approximately ½. As the number of RF chains, M, is increased, the total time can be reduced even further (by as much as approximately 1/M).

Then, (B) a UT 120i receives the signals and determines which of the directions 504 is associated with a best received packet. The present disclosure contemplates that in the various aspects, the UT 120i can be configured similar to AP 110 to receive the signals. In particular, UT 120i can also be configured as shown in FIG. 5 in order to support reception of signals using the different orthogonal transmission types. That is, RF chains in the UT 120i can be configured for the different orthogonal transmission types supported by the AP and can be selectively coupled to radiating elements to await of reception of the signals representing the training packets. That is, UT 120i supports a listening mode for two or more orthogonal transmission types. In some aspects, the UT 120i can be configured so as to provide an omnidirectional or even a quasi-omnidirectional pattern across the various radiating elements 510-1 to 510N during the training process. That is a pattern which is substantially uniform in phase, amplitude, and/or other properties. As used herein, the term "substantially" refers to being within 20% of the stated property. However, the UT 120i can also perform a sector sweep during reception, including sector sweeps for the various orthogonal transmission types.

Thereafter, once the preferred direction for AP 110 is identified, (C) the UT 120i can transmit a feedback signal 606 back to the AP 110. Thereafter, the AP 110 can be configured to provide the communications session with UT 120i using the selected direction. Additionally, at the UT 120i, appropriate phase and amplitude settings can be provided to support a communications session in the identified direction.

As discussed above, aspects of the present disclosure contemplate that each of the RF chains available is associated with a different subset of radiating elements. These subsets can be defined in a variety of ways. Some exemplary configurations for subsets are discussed below with respect to FIGS. 7 and 8.

In the exemplary configurations, it is assumed that two RF chains are available. However, this is solely for ease of illustration. The present disclosure contemplates that the methodologies associated with FIGS. 7 and 8 can be extended to any number of RF chains. Further, even though the exemplary configurations illustrate a particular number and arrangement of radiating elements, this is also solely for ease of illustration. Rather, the present disclosure contemplates that the methodologies associated with FIGS. 7 and 8 can be extended to any number of radiating elements in any arrangement.

Figure 7:
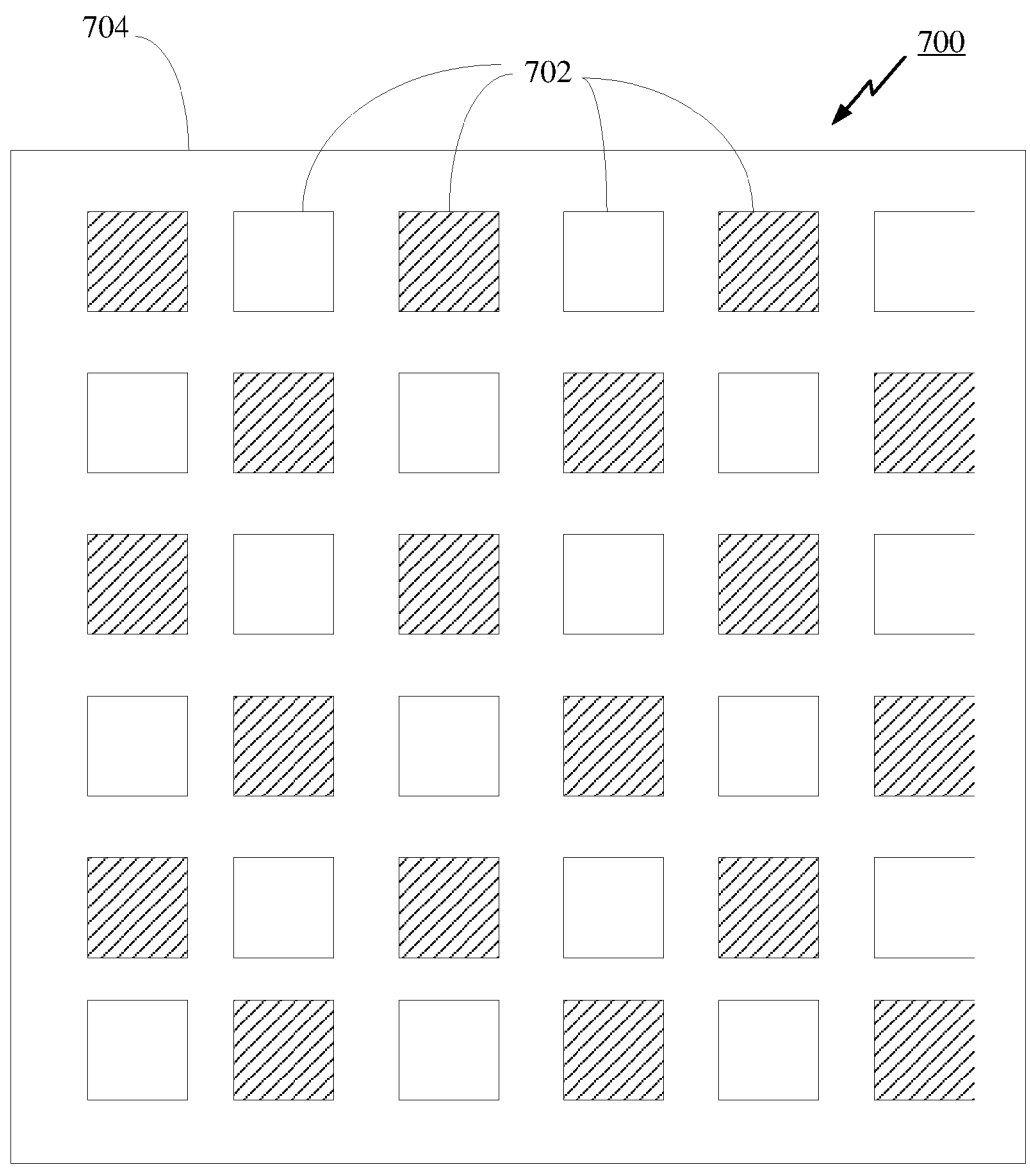
FIG. 7 shows a first exemplary arrangement of antenna elements according to an aspect of the present disclosure.

In FIG. 7 shows an antenna array 700 consisting of 36 radiating elements 702 arranged in a 6×6 array on a supporting substrate 704 and configured in accordance with an aspect of the present disclosure. In particular, the radiating elements 702 are associated with different RF chains (indicated by hatch pattern or lack thereof) in an alternating pattern to define two different subsets of equal numbers of the radiating elements 702. Such a configuration is useful in the radiating elements 702 of each subset extend over the entire surface of the substrate. Thus, the radiating elements 702 of each substrate 704 can be effectively utilized as a complete sub-array that supports transmission in most, if not all, the directions supported by the entire array 700. Thus, greater flexibility can be provided for purposes of training.

However, the present disclosure contemplates that the radiating elements 702 can be divided between RF chains in a variety of other ways. For example, in other aspects, the radiating elements can be divided in different patterns. In other aspects, the radiating elements 702 can be divided in different numbers. In still other aspects, the radiating elements can be divided between RF chains using a combination of the foregoing.

The present disclosure also contemplates that the configuration of radiating elements and RF chains at a receiving device (e.g., a user terminal) may be substantially the same as that at a corresponding transmitting device (e.g., an AP). However, the present disclosure also contemplates that the transmitting and receiving devices may also have different configurations of radiating elements and RF chains.

The configuration of FIG. 7 provides a configuration for the radiating element 702 that is effectively predefined for each of the RF chains. However, the present disclosure contemplates that the radiating elements for an RF chain can be selected dynamically or even randomly. This is illustrated below with respect to FIG. 8.

Figure 8:
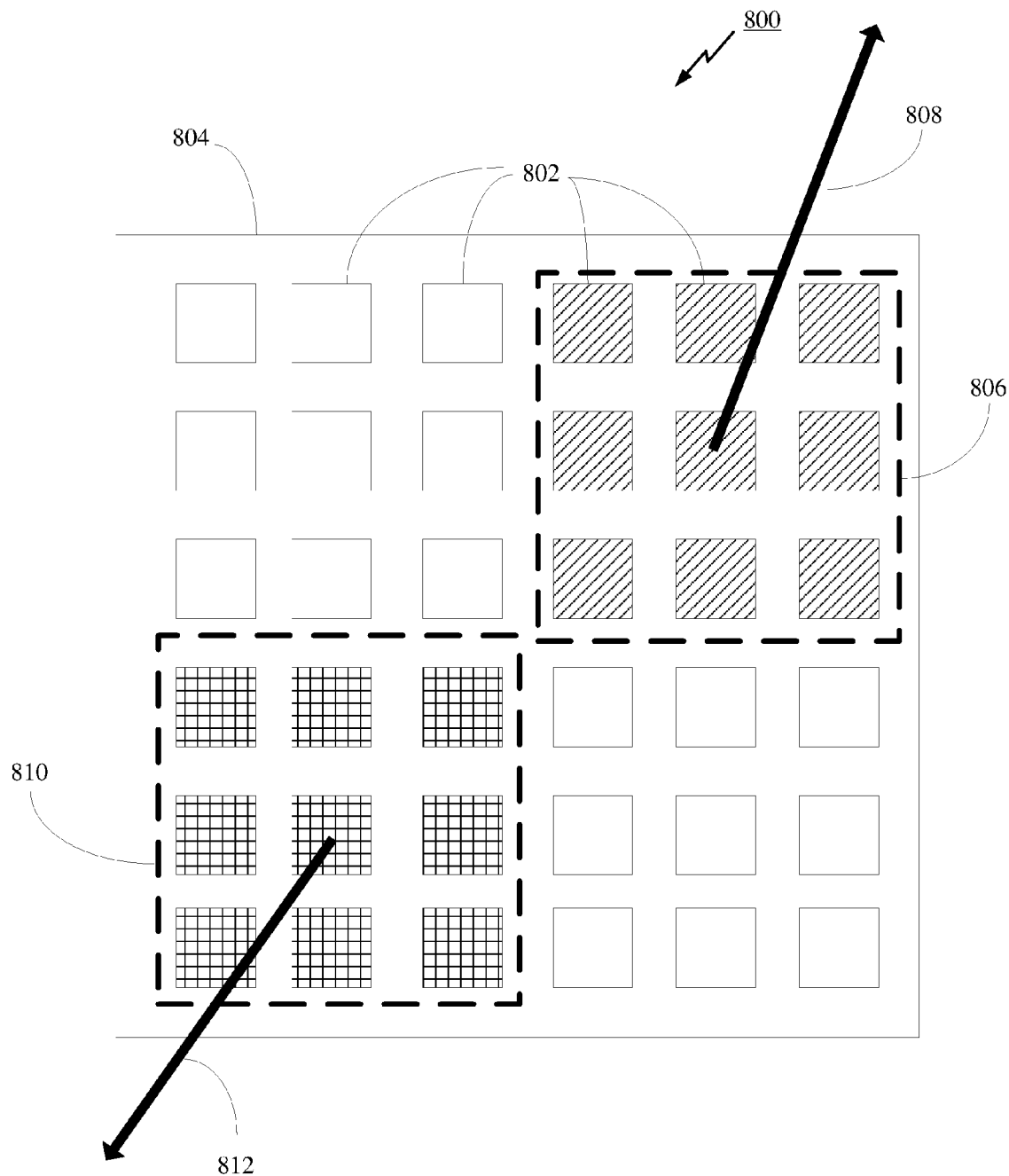
FIG. 8 shows a second exemplary arrangement of antenna elements according to an aspect of the present disclosure.

In FIG. 8, there is shown an antenna array 800 consisting of consisting of 36 radiating elements 802 arranged in a 6×6 array on a supporting substrate 804 and configured in accordance with an aspect of the present disclosure. As discussed above with respect to FIG. 7, one option is pre-define or pre-identifying the radiating elements to be utilized for a particular direction. However, the present disclosure also contemplates that for providing beam forming in some directions, it may not be necessary to use radiating elements that extend across the surface of a supporting substrate. Alternatively stated, there may be radiating elements which will not contribute significantly to a beam in a particular direction. Thus, radiating elements are effectively free for use for a different RF chain. This concept is illustrated with respect FIG. 8.

For example, as shown in FIG. 8, it may be understood that the portion of radiating elements 802 in subset 806 are the only radiating elements that contribute significantly to a beam in direction 808. This may be based on empirical or simulation data or other data. For example, a processing system may have a table or other data structure that identifies radiating elements associated with each direction. Alternatively, this may also be based on a processing system monitoring the amplitude selected for each of the radiating elements 802. That is, if the amplitude selected for a radiating element is above a threshold amplitude value, the radiating element may be identified as contributing significantly. Once the subset 806 for direction 808 is identified, a first RF chain is associated with the subset 806 to effect transmission in the direction 808. Concurrently, the remaining ones of radiating elements 802 can be made available for one or more other RF chains. For example, as shown in FIG. 8, the portion of radiating elements 802 in subset 810 can be associated with a second RF chain to effect contemporaneous transmission in a second direction 812. In some aspects, all of the remaining ones of radiating elements 802 can be made available to the second RF chain. In other aspects, the portion of radiating elements 802 in subset 810 can be selected in substantially a same manner as the portion of radiating elements 802 in subset 806.

The present disclosure contemplates that in some cases, the remaining ones of radiating elements 802 may be insufficient to support transmission in any direction. Accordingly, in some cases, transmission in some directions may not be accompanied by a contemporaneous transmission in a different direction. Conversely, the present disclosure also contemplates that the remaining ones of the radiating elements 802 may also be able to support transmission in a variety of directions. Accordingly, in some cases, transmission in some directions may be accompanied by a contemporaneous transmission in a plurality of different directions.

The present disclosure also contemplates that in some cases the same radiating elements and the same PAs may be used to transmit into at least two different directions. In such aspects, for RF chains associated with a same radiating element, the RF chains can be configured to have different amplifiers and phase shifters. Thus, each radiating element can potentially support any transmitting signals from different RF chains as long as the signals are orthogonal transmission types. In some configurations, this can result in a reduction of the power output for each direction by at least 3 dB. For example, by using the same power amplifier for two or more RF chains feeding a same radiating element.

Figure 9:
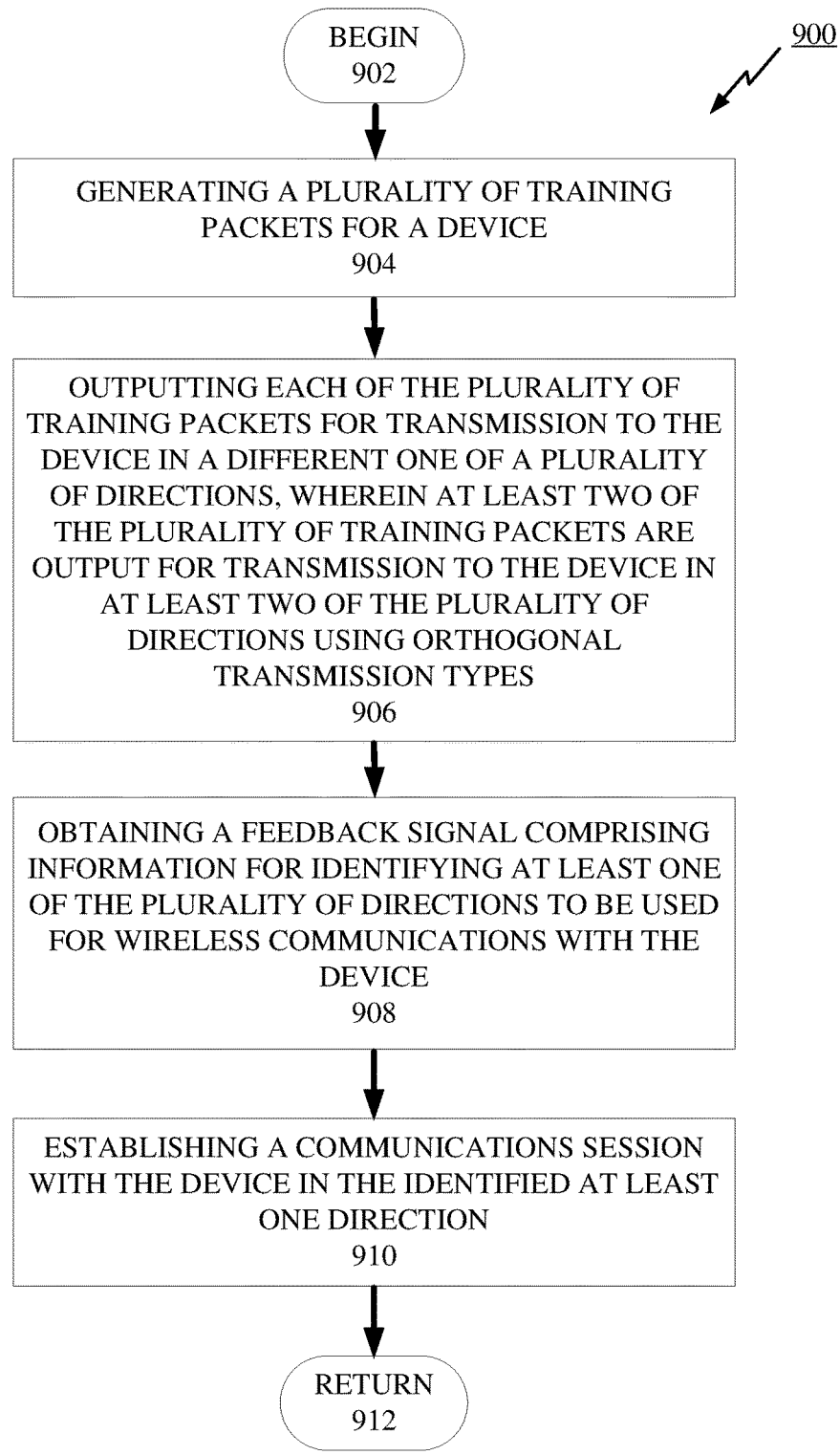
FIG. 9 is a flowchart of steps in a first exemplary method according to an aspect of the present disclosure.

FIG. 9 is a flowchart of steps in a first exemplary method 900 according to an aspect of the present disclosure. In particular, method 900 corresponds to steps for a transmitting device performing a sector sweep for a receiving device, such as AP 110, as previously discussed with respect to FIG. 6. Method 900 begins at step 902 and proceeds to step 904. At step 904, a plurality of training packets can be generated for transmission in the different directions. The training packets can be configured to include data for analysis at a receiving device to determine how well each packet was received. Further, the training packets can also include identifying information for use by a receiving device to generate feedback for the transmitting device. For example, a training packet may include an identification of the transmitting device to enable a feedback signal to be transmitted back to the transmitting device. Further, the training packet may also include an identification of a direction associated with the training packet. In some aspects, this may identify the actual direction. In other aspects, this may only provide an identifier that the transmitting device has associated with a particular direction.

Following or contemporaneously with step 904, the method proceeds to step 906. At step 906, each of the plurality of training packets is output for transmission to the device in a different one of a plurality of directions, wherein at least two of the training packets are output for transmission to the device in at least two of the plurality of direction using orthogonal transmission types. The use of orthogonal transmission types allows contemporaneous transmission, as previously discussed. As noted above, step 906 can be performed contemporaneously with step 904. Therefore, in some aspects, the training packets for each direction may not be generated until the transmitting device is ready to output a training packet in the particular direction. In some aspects, this configuration may be required. For example, as discussed above with respect to FIG. 8, a direction for a training packet may not be known a priori. Accordingly, generating of the training packet may be delayed until the direction is ascertained. In other aspects, a partial training packet may be generated a priori without the direction information. Thereafter, the direction information may be appended thereto before the training packet is outputted in the corresponding direction.

After the training packets are output at step 906, the transmitting device can obtain a feedback signal from the network comprising information for identifying at least one direction to utilize for the receiving device at 908. Step 908 can also involve determining the at least one direction for the receiving device based on the feedback signal.

In some aspects, step 908 involves the transmitting device switching from an outputting mode to a listening mode to await arrival of the feedback signal from the receiving device. In other aspects, the feedback signal may be sent via a different communications link between the transmitting device and the receiving device.

The present disclosure also contemplates that the content of the feedback signal can vary. In some aspects, a feedback signal can be configured to include an explicit identification of the at least one direction to utilize for the receiving device. In other aspects, the feedback signal may identify several directions. Such a configuration can be advantageous if conditions vary after the sector sweep is performed in order to allow the communications link to be maintained. In other aspects, the feedback signal may simply include data regarding the analysis of the various training packets received by the receiving device to allow the transmitting device to analyze and determine the appropriate direction. Further, in some aspects, the feedback signal may only include an identifier which the transmitting device can utilize with an index to identify the at least one direction.

Once the feedback signal is received at step 908, the method can then proceed to step 910. At step 910, a communications session with the receiving device can be established based on the identified at least one direction. In particular, the transmitting device can be configured to send and receive signals from the receiving device in the identified at least one direction. Thereafter, the method can proceed to step 912 to resume previous processing, include repeating method 900 as needed.

Figure 10:
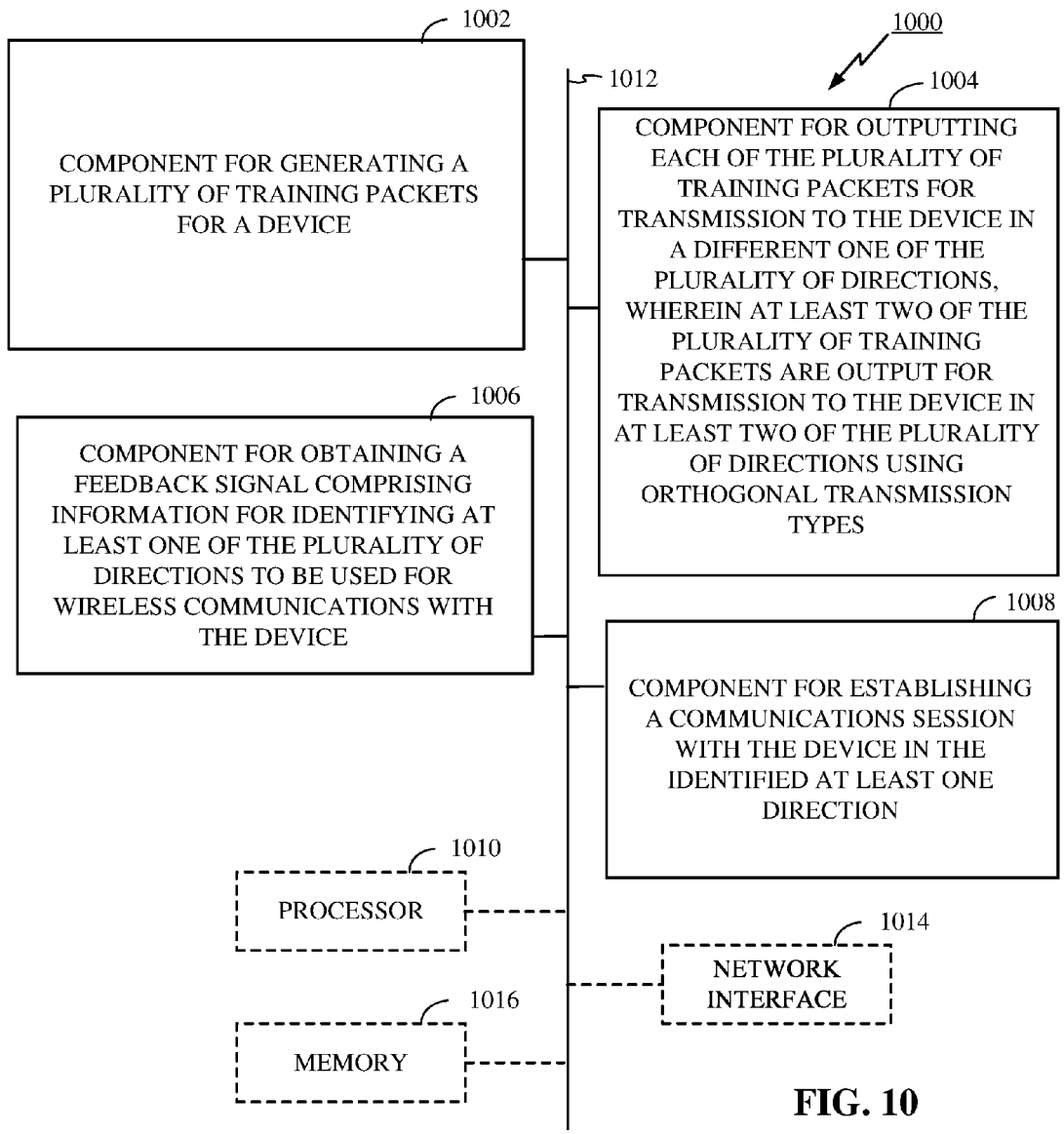
FIG. 10 illustrates an example apparatus for implementing the methodology of FIG. 9.

With reference to FIG. 10, there is provided an exemplary apparatus 1000 that may be configured as a wireless entity, such an AP device or other suitable entity, or as a processor, component or similar device for use within such as wireless entity. The apparatus 1000 may include functional blocks that may represent functions implemented by a processor, software, or combinations thereof (e.g. firmware), such as the functions set forth in FIG. 9.

As illustrated, in one embodiment, the apparatus 1000 may include an electrical component or module 1002 for generating a plurality of training packets for a device. The apparatus 1000 may also include an electrical component or module 1004 for outputting each of the plurality of training packets for transmission to the device in a different one of the plurality of directions, wherein at least two of the plurality of training packets are output for transmission to the device in at least two of the plurality of directions using orthogonal transmission types. The apparatus 1000 may include an electrical component or module 1006 for obtaining a feedback signal comprising information for identifying at least one of the plurality of directions to be used for wireless communications with the device. The apparatus 1000 may also include an electrical component or module 1008 for establishing a communications session with the device in the identified at least one direction.

In related aspects, the apparatus 1000 may optionally include a processor component 1010 having at least one processor, in the case of the apparatus 1000 configured as a network entity. The processor 1010, in such case, may communicate with the components 1002-1006 or similar components via a bus 1012 or similar communication coupling. The processor 1010 may effect initiation and scheduling of the processes or functions performed by electrical components or modules 1002-1006.

In further related aspects, the apparatus 1000 may include a network interface component 1014 for communicating with other network entities. The apparatus 1000 may optionally include a component for storing information, such as, for example, a memory device/component 1016. The computer readable medium or the memory component 1016 may be operatively coupled to the other components of the apparatus 1000 via the bus 1012 or the like. The memory component 1016 may be adapted to store computer readable instructions and data for performing the activity of the components 1002-1006, and subcomponents thereof, or the processor 1010. The memory component 1016 may retain instructions for executing functions associated with the components 1002-1006. While shown as being external to the memory 1016, it is to be understood that the components 1002-1006 may exist within the memory 1016.

Figure 11:
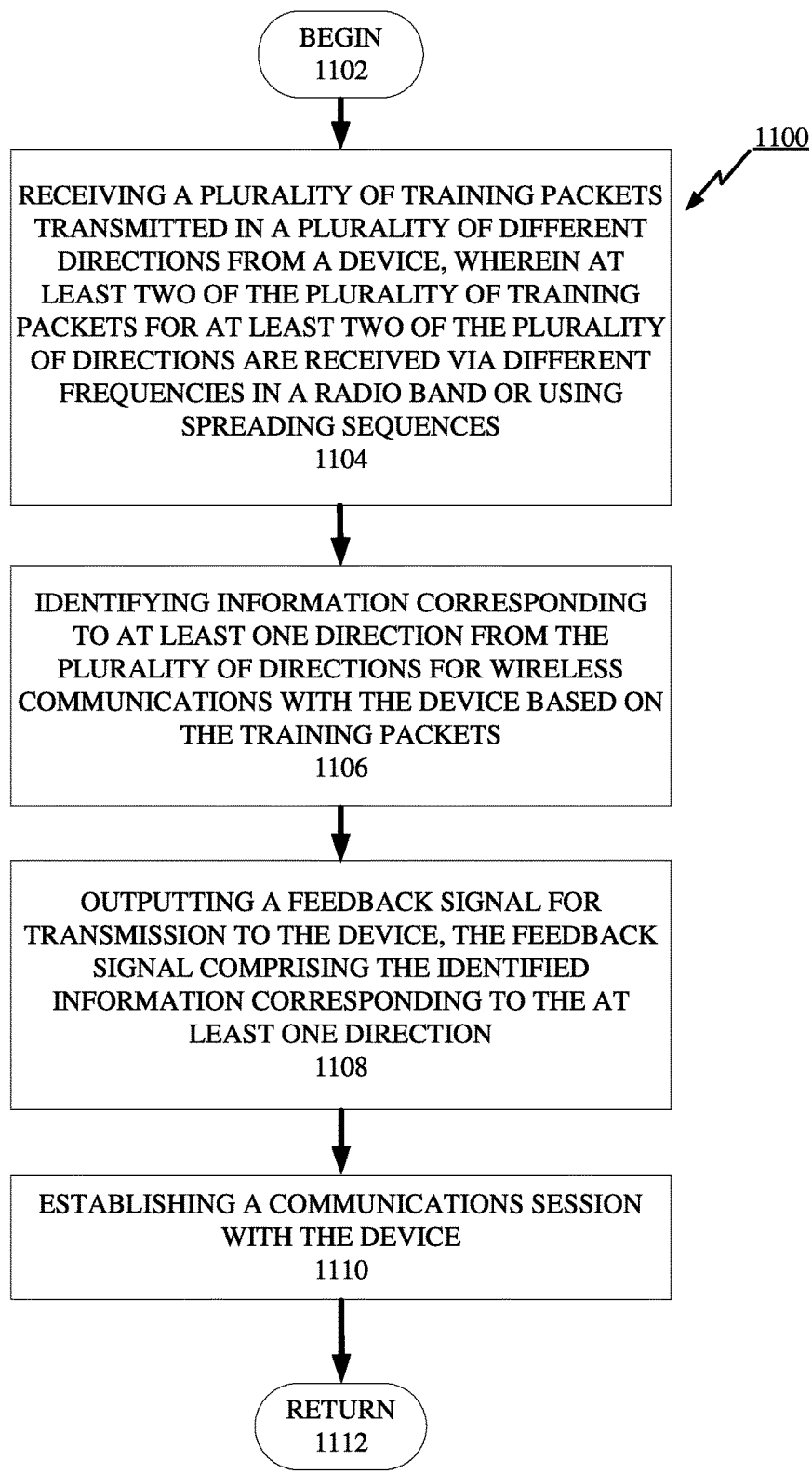
FIG. 11 is a flowchart of steps in a second exemplary method according to an aspect of the present disclosure.

FIG. 11 is a flowchart of steps in a second exemplary method 1100 according to an aspect of the present disclosure. In particular, method 1100 corresponds to steps for a receiving device, such as UT 120i in FIG. 6, associated with a sector sweep being performed by a transmitting device, such as the AP 110 in FIG. 6. Method 1100 begins at step 1102 and proceeds to step 1104. At step 1104, a plurality of training packets transmitted in a plurality of different directions from a device is received, wherein at least two of the training packets for at least two of the plurality of different directions are received via different frequencies in a radio band or using different spreading sequences. In some aspects, these training packets may have been transmitted contemporaneously, as previously discussed. Step 1104 can involve configuring the receiving device to operate in a listening mode, such that it is capable of detecting signals using the orthogonal transmission types.

As noted above, the training packets can be configured to include data for analysis at a receiving device to determine how well each packet was received. Further, the training packets can also include identifying information for use by a receiving device to generate feedback for the transmitting device. For example, a training packet may include an identification of the transmitting device to enable a feedback signal to be transmitted back to the transmitting device. Further, the training packet may also include an identification of a direction associated with the training packet. In some aspects, this may identify the actual direction. In other aspects, this may only provide an identifier that the transmitting device has associated with a particular direction, such as value or identified from an index stored at the transmitting device.

The present disclosure also contemplates that the direction may be unknown to the receiving device. For example, in some aspects, the training packets in each direction are associated with values in an index. That is, the physical meaning (i.e., directions) are known only to the transmitting device. Thus, instead of direction, an index may be included in the feedback to the transmitting device. The transmitting device can then determine the direction using this index value.

Following 1104, the method proceeds to step 1106. At step 1106, at least one of the plurality of directions is identified based on the training packets received. This can be an actual identification of a direction or an identification of an index value or training packet associated with a direction. In some aspects, this can involve analyzing the received training packets to determine which one was best received. This can be done by determining a characteristic value for each received training packet, comparing the characteristic values for the received packets, and determining the best received packet based on the comparison. For example, this can involve determining which of the packets was received with a lowest error rate. Alternatively, this can involve determining which of the packets was received with the highest signal power. Alternatively, this can involve determining which of the packets was received with the lowest interference power. Alternatively, this can involve determining which of the packets was received with the highest signal power, taking into account the receiver gain difference between the frequencies. Alternatively, this can involve determining which of the packets required the least amount of reconstruction noise. In other aspects, this can involve obtaining bit error rates and/or reconstruction amounts, and comparing these to a threshold value. Thereafter, the multiple acceptable directions can be identified. In still other aspects, a combination of approaches can be utilized. For example, directions with packets meeting a threshold can be identified and a smaller group of these can be used to identify the acceptable directions.

After the at least direction is identified at step 1106, the receiving device can output a feedback signal to the network identifying information corresponding to the at least one direction for the transmitting device to utilize for the receiving device at 1108. In some aspects, step 1108 involves the receiving device switching from a listening mode to an outputting mode to output the feedback signal to the transmitting device. In other aspects, the feedback signal may be sent via a different communications link between the transmitting device and the receiving device.

In some aspects, the receiving device can take advantage of the fact that a direction for the transmitting device has been identified. In such cases, the receiving device can be configured to output the feedback signal in a complementary direction for the identified direction for the transmitting device.

As noted above, the present disclosure also contemplates that the content of the feedback signal can vary. In some aspects, a feedback signal can be configured to include an explicit identification of the direction to utilize for the receiving device. In other aspects, the feedback signal may identify several directions. Such a configuration can be advantageous if conditions vary after the sector sweep is performed in order to allow the communications link to be maintained and in cases where the decision regarding the best sector is suboptimal due to a non-ideal omnidirectional pattern or a non-ideal frequency response at the receiver. In other aspects, the feedback signal may simply include data regarding the analysis of the various training packets received by the receiving device to allow the transmitting device to analyze and determine the appropriate direction.

In some aspects, the feedback message may be the same regardless of the number of RF chains used for transmission of the training packets, and may include a specific ID for each sector selected, regardless of the frequency or spreading sequence used. For example, the ID can be the index values discussed above. Such a configuration may be used to maintain backward compatibility with legacy feedback message formats, but may require the transmitter to fully utilize the multiple input (MI) chains of the MIMO configuration and send different message on each direction.

In other aspects, where identical packets are transmitted in each direction, the feedback message may include both the specific ID associated with the packet (packet identification) and an additional index which indicates which frequency or spreading sequence was used for the packet. Thus, the combination of packet ID and the frequency and/or spreading sequence can be used to provide information for identifying the direction. This may be implemented using a new feedback message format or use reserved bits in an existing feedback message format. This configuration allows the transmitter to use a single RF chain in order to transmit simultaneously several sectors, using the same message in each of these sectors, therefore avoiding full MI chains.

Once the feedback signal is output at step 1108, the method can then proceed to step 1110. At step 1110, a communications session with the transmitting device can be established based on the feedback signal. In particular, the receiving device can be configured to send and receive signals from the transmitting device. In some aspects, the receiving device can be configured to utilize a direction complementary to the identified at least one direction.

Thereafter, the method can proceed to step 1112 to resume previous processing, include repeating method 1100 as needed.

Figure 12:
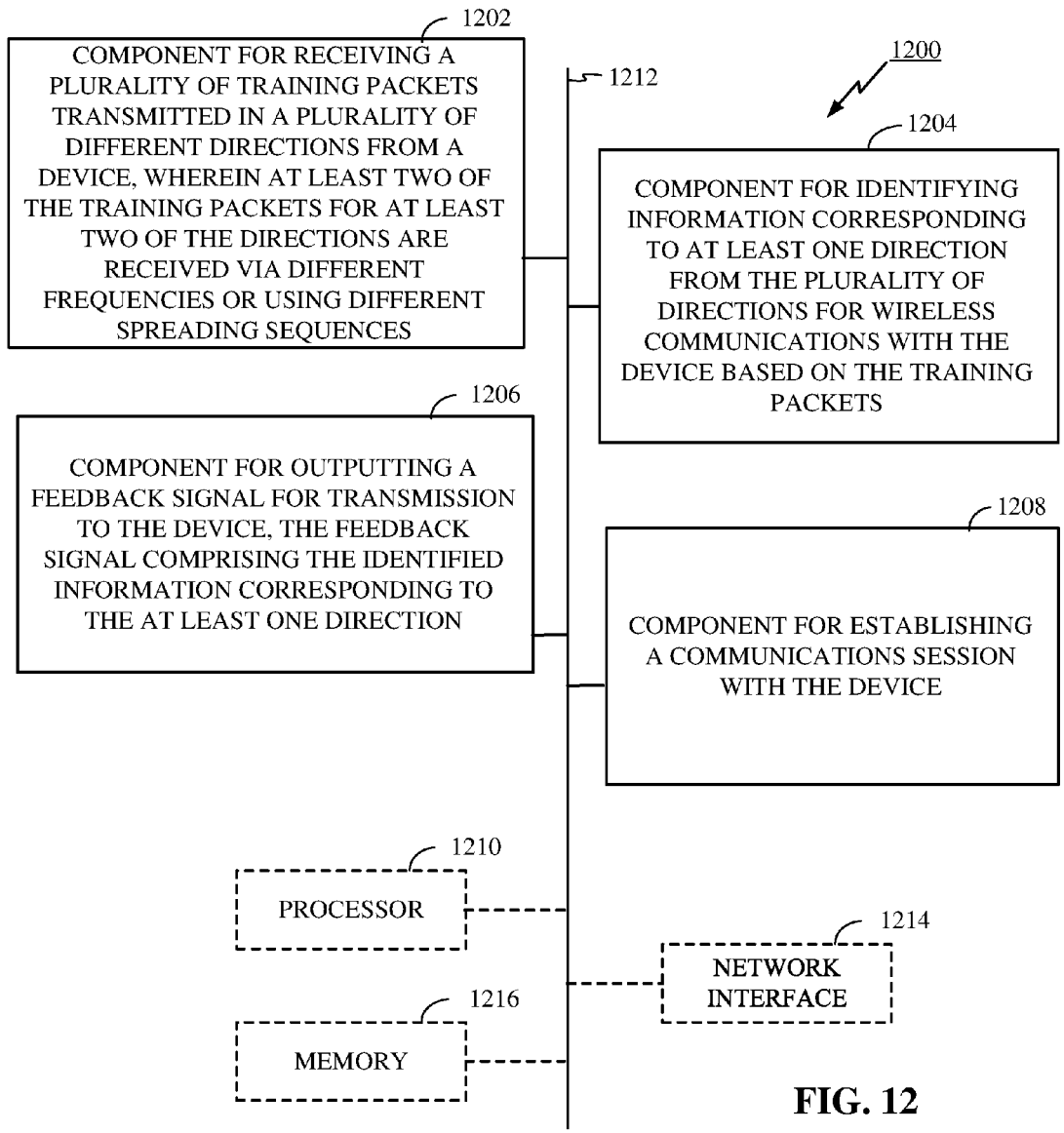
FIG. 12 illustrates an example apparatus for implementing the methodology of FIG. 11.

With reference to FIG. 12, there is provided an exemplary apparatus 1200 that may be configured as a wireless entity, such an AP device or other suitable entity, or as a processor, component or similar device for use within such as wireless entity. The apparatus 1200 may include functional blocks that may represent functions implemented by a processor, software, or combinations thereof (e.g. firmware), such as the functions set forth in FIG. 11.

As illustrated, in one embodiment, the apparatus 1200 may include an electrical component or module 1202 for receiving a plurality of training packets for a device that have been transmitted in a plurality of directions, where at least two of the plurality training packets for at least two of the plurality of directions are receive via different frequencies or using different spreading sequences. The apparatus 1200 may also include an electrical component or module 1204 for identifying at least one of the plurality of directions for a communications session based on the training packets. The apparatus 1200 may include an electrical component or module 1206 for outputting a feedback signal to the network identifying the at least one of the plurality of directions. The apparatus 1200 may also include an electrical component or module 1208 for establishing a communications session with the device.

In related aspects, the apparatus 1200 may optionally include a processor component 1212 having at least one processor, in the case of the apparatus 1200 configured as a network entity. The processor 1212, in such case, may communicate with the components 1202-1206 or similar components via a bus 1212 or similar communication coupling. The processor 1212 may effect initiation and scheduling of the processes or functions performed by electrical components or modules 1202-1206.

In further related aspects, the apparatus 1200 may include a network interface component 1214 for communicating with other network entities. The apparatus 1200 may optionally include a component for storing information, such as, for example, a memory device/component 1216. The computer readable medium or the memory component 1216 may be operatively coupled to the other components of the apparatus 1200 via the bus 1212 or the like. The memory component 1216 may be adapted to store computer readable instructions and data for performing the activity of the components 1202-1206, and subcomponents thereof, or the processor 1212. The memory component 1216 may retain instructions for executing functions associated with the components 1202-1206. While shown as being external to the memory 1216, it is to be understood that the components 1202-1206 may exist within the memory 1216.

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering. For example, operations illustrated in FIGS. 9 and 11 correspond to the means illustrated in FIGS. 10 and 12, respectively.

Means for generating may include a processing system, which may include one or more processors, such as the processors 210, 242, and/or the controller 230 of the access point 110 illustrated in FIG. 2 or the processor 304 and/or the DSP 320 portrayed in FIG. 3. The means for outputting (e.g., transmitting) may comprise a transmitter (e.g., the transmitter unit 222) and/or an antenna(s) 224 of the access point 110 illustrated in FIG. 2 or the transmitter 310 and/or antenna(s) 316 depicted in FIG. 3. Means for obtaining (e.g., receiving) may comprise a receiver (e.g., the receiver unit 254) and/or an antenna(s) 252 of the UT 120 illustrated in FIG. 2 or the receiver 312 and/or antenna(s) 316 depicted in FIG. 3. Any means for determining, means for selecting, means for identifying, or means for establishing may include a processing system, which may include one or more processors such as processors 260, 270, 288, and 290 and/or the controller 280 of the UT 120 or the processor 304 and/or the DSP 320 depicted in FIG. 3.

According to certain aspects, such means may be implemented by processing systems configured to perform the corresponding functions by implementing various algorithms (e.g., in hardware or by executing software instructions) described above.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Furthermore, "determining" may include resolving, selecting, choosing, establishing and the like.

As used herein, the term "outputting" may involve actual transmission or output of a structure from one entity (e.g., a processing system) to another entity (e.g., an RF front end or modem) for transmission. As used herein, the term "obtaining" may involve actual receiving of a structure transmitted over the air or obtaining the structure by one entity (e.g., a processing system) from another entity (e.g., an RF front end or modem).

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the Physical (PHY) layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may comprise a computer-readable medium having instructions stored (and/or encoded) thereon, the instructions being executable by one or more processors to perform the operations described herein and be embodied in a computer-program product. The computer-program product may comprise packaging materials to advertise the computer-readable medium therein for purchase by consumers.

In a hardware implementation, the machine-readable media may be part of the processing system separate from the processor. However, as those skilled in the art will readily appreciate, the machine-readable media, or any portion thereof, may be external to the processing system.

By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications, comprising:
generating a plurality of training packets;
outputting each of the plurality of training packets for transmission to a device in a different one of a plurality of directions, wherein at least two of the plurality of training packets are output for transmission to the device in at least two of the plurality of directions using orthogonal transmission types; and
obtaining a feedback signal comprising information for identifying at least one of the plurality of directions to be used for wireless communications with the device;
wherein the outputting comprises outputting each of the at least two of the plurality of training packets to a respective one of a plurality of radio chains, wherein each of the plurality of radio chains is configured to support one of the orthogonal transmission types, and wherein each of the plurality of radio chains is coupled to a respective one of a plurality of antenna subsets of a plurality of antennas.

2. The method of claim 1, wherein the orthogonal transmission types comprise transmission types using different frequencies in a radio band.

3. The method of claim 1, wherein the orthogonal transmission types comprise transmission types using different spreading sequences in a radio band.

4. The method of claim 1, wherein the antenna subset associated with each of the plurality of radio chains is used throughout transmission of all of the plurality of training packets.

5. The method of claim 1, further comprising dynamically selecting the antenna subset associated with each of the plurality of radio chains.

6. The method of claim 1, wherein the at least two of the plurality of training packets for the at least two of the plurality of directions are output for transmission to the device contemporaneously.

7. The method of claim 1, wherein the information for identifying the at least one of the plurality of directions comprises at least one of an index, a packet identification (ID), a frequency, or a spreading sequence.

8. A method for wireless communications, comprising:
receiving a plurality of training packets transmitted in a plurality of different directions from a device, wherein at least two of the plurality of training packets for at least two of the plurality of different directions are received via different frequencies in a radio band or using different spreading sequences;
identifying information corresponding to at least one direction from the plurality of directions for wireless communications with the device based on the plurality of training packets; and
outputting a feedback signal for transmission to the device, the feedback signal comprising the identified information corresponding to the at least one direction;
wherein identifying the information comprises:
determining a characteristic value for each of the plurality of training packets;
comparing the characteristic values for the plurality of training packets; and
selecting the information corresponding to the at least one direction based on the comparison.

9. The method of claim 8, wherein the receiving comprises providing a plurality of radio chains, each of the plurality of radio chains configured to support reception via one of the different frequencies in the radio band or using one of the different spreading sequences.

10. The method of claim 8, wherein the characteristic value for each of the plurality of training packets includes at least one of an error rate of the training packet, an interference power of the training packet, or a signal power of the training packet.

11. The method of claim 10, wherein the selecting comprises determining one of the plurality of training packets having a lowest one of the error rates, a lowest one of the interference powers, or a highest one of the signal powers.

12. The method of claim 8, wherein the information corresponding to the at least one direction comprises at least one of an index, a packet identification (ID), a frequency, or a spreading sequence.

13. An apparatus for wireless communications, comprising:
a processing system configured to generate a plurality of training packets;
a first interface configured to output each of the plurality of training packets for transmission to a device in a different one of a plurality of directions, wherein at least two of the plurality of training packets are output for transmission to the device in at least two of the plurality of directions using orthogonal transmission types; and
a second interface configured to obtain a feedback signal comprising information for identifying at least one of the plurality of directions to be used for wireless communications with the device;
wherein the first interface comprises a plurality of radio chains, wherein each of the plurality of radio chains is configured to support one of the orthogonal transmission types, and wherein each of the plurality of radio chains is coupled to a respective one of a plurality of antenna subsets of a plurality of antennas.

14. The apparatus of claim 13, wherein the orthogonal transmission types comprise transmission types using different frequencies in a radio band.

15. The apparatus of claim 13, wherein the orthogonal transmission types comprise transmission types using different spreading sequences in a radio band.

16. The apparatus of claim 13, wherein the antenna subset associated with each of the plurality of radio chains is used throughout transmission of all of the plurality of training packets.

17. The apparatus of claim 13, wherein the processing system is further configured to dynamically select the antenna subset associated with each of the plurality of radio chains.

18. The apparatus of claim 13, wherein the interface is configured to output the at least two of the plurality of training packets for transmission to the device contemporaneously.

19. The apparatus of claim 13, wherein the information for identifying the at least one of the plurality of directions comprises at least one of an index, a packet identification (ID), a frequency, or a spreading sequence.

20. The apparatus of claim 13, wherein the apparatus comprises the plurality of antennas, and the apparatus is configured as a wireless node.

21. An apparatus for wireless communications, comprising:
a first interface configured to receive a plurality of training packets transmitted in a plurality of different directions from a device, wherein at least two of the plurality of training packets for at least two of the plurality of different directions are received via different frequencies in a radio band or using different spreading sequences;
a processing system configured to identify information corresponding to at least one direction from the plurality of directions for wireless communications with the device based on the plurality of training packets; and
a second interface for outputting a feedback signal for transmission to the device, the feedback signal comprising the identified information corresponding to the at least one direction;
wherein the processing system is further configured to identify the information corresponding to the at least one direction of the plurality of directions by:
determining a characteristic value for each of the plurality of training packets;
comparing the characteristic values for the plurality of training packets; and
selecting the information corresponding to the at least one direction based on the comparison.

22. The apparatus of claim 21, wherein the first interface comprises a plurality of radio chains, each of the plurality of radio chains configured to support reception via one of the different frequencies in the radio band or using one of the different spreading sequences.

23. The apparatus of claim 21, wherein the characteristic value for each of the plurality of training packets includes at least one of an error rate of the training packet, an interference power of the training packet, or a signal power of the training packet.

24. The apparatus of claim 23, wherein the selection comprises determining one of the plurality of training packets having a lowest one of the error rates, a lowest one of the interference powers, or a highest one of the signal powers.

25. The apparatus of claim 21, wherein the information corresponding to the at least one direction comprises at least one of an index, a packet identification (ID), a frequency, or a spreading sequence.

26. The apparatus of claim 21, further comprising at least one antenna, wherein the interface is configured to receive the plurality of training packets via the at least one antenna, and the apparatus is configured as a wireless node.

\* \* \* \* \*